United States Patent [19]

Kendall

[11] 4,372,991

[45] Feb. 8, 1983

[54] COMBINATION SCRATCH FILLER AND PRIMER IN AEROSOL FORM

[75] Inventor: Stanley E. Kendall, Wilmette, Ill.

[73] Assignee: American Home Products Corporation, New York, N.Y.

[21] Appl. No.: 291,657

[22] Filed: Aug. 10, 1981

[51] Int. Cl.³ .................... C08L 1/08; C08L 1/18; B32B 35/00

[52] U.S. Cl. .................... 427/140; 106/171; 106/195

[58] Field of Search .................... 106/171, 180, 195; 428/458; 26/16; 427/140

[56] References Cited

U.S. PATENT DOCUMENTS

| | | | |
|---|---|---|---|
| 3,087,835 | 4/1963 | Auer | 106/195 |
| 3,093,497 | 6/1963 | Demaison | 106/59 |
| 3,536,509 | 10/1970 | Tay | 106/196 |
| 3,873,475 | 3/1975 | Pechacek et al. | 117/2 |
| 4,042,539 | 8/1977 | Fanning | 260/16 |
| 4,089,994 | 5/1978 | Mattsson et al. | 427/140 |
| 4,197,221 | 4/1980 | Eisenmenger | 106/195 |
| 4,217,376 | 8/1980 | Donermeyer et al. | 427/142 |
| 4,249,953 | 2/1981 | Keifer et al. | 106/195 |

*Primary Examiner*—Theodore Morris
*Attorney, Agent, or Firm*—Joseph Martin Weigman

[57] ABSTRACT

A combination scratch filler and primer for painted metal surfaces can be dispensed in an aerosol system. The composition has a high solids content and an anti-settling agent to make the solids readily dispersible even after long storage. The solids content is preferably 45 to 51 percent by weight of the concentrate and from 19 to 22 percent by weight of the concentrate, solvents and propellent. The anti-settling agent is present in a volume ratio to the solids of 1:10 to 1:50.

3 Claims, No Drawings

COMBINATION SCRATCH FILLER AND PRIMER IN AEROSOL FORM

This invention relates to a method and composition for repairing damages to finished surfaces. More particularly, the invention relates to a method and compositions for filling in dents, holes, scratches and the like in metal, fiberglass and other substrates having painted, enameled, lacquered or similar finishes.

For filling in dents, holes, scratches and the like in metal, fiberglass and other surfaces, body fillers in semi-solid or solid form and in non-aerosol form have long been available. Such products are applied with a spatula, squeegee or other spreading means in a heavy paste-like consistency. After curing or drying, they are filed or sanded to a relatively smooth surface, and a primer is applied prior to the application of a finish coat of paint, enamel, lacquer or the like. U.S. Pat. No. 4,089,994 teaches a sprayable composition suitable for repairing scratches on, e.g. autos. The use of a filler-containing composition in auto repair is disclosed in U.S. Pat. Nos. 4,217,376 and 3,873,475.

Primers for use in providing needed adhesion of top coat materials to metals, fiberglass and other substrates and to provide a prime coat that can be sanded to a very smooth surface and in brush, air spray and aerosol form are known in the art with a great variety of products available.

Up to the present time there has been no composition which combines both filler and primer functions and is dispensible in an aerosol system.

It is an object of the present invention to provide a scratch filler and primer which combines the functions and purposes of a filler with those of a primer in one composition.

It is a further object of this invention to provide a combined filler and primer formulation in aerosol form for ease of application and deposit to an even, uniform surface.

It is another object of the present invention to provide a product which is free from hard setting, may be easily applied, is fast drying and easily sanded to an extremely glossy surface.

It is another object of the present invention to provide a scratch filler and primer formulation which is easily agitated and mixed, has excellent filling properties for scratch and minor dents, has an excellent adhesion to steel and other substrates and which will not shrink or crack the film on aging.

The objects of this invention may be achieved with a high solids lacquer composition containing an anti-settling agent and an adhesion-aiding agent. The solids content must be above 17 percent by weight in an aerosol system and preferably is about 19 to 22 percent. The solids content of the concentrated composition prior to the addition of solvents and propellent must be above 40 percent by weight of the concentrate and preferably is about 45 to 51 percent.

Most lacquer aerosol primers have concentrate solids of 26-30 percent and aerosol dispersion ("in can") solids of 10 to 12 percent. Some enamel formulations have concentrated solids of 42-46 percent and "in can" solids concentration of 5-17 percent, but enamel formulations normally contain more solids than lacquer formulations.

Enamel formulations have excellent sanding qualities when used as a finish. However, enamel formulations are not suitable for use as a filler because in heavy films, they badly gum the sandpaper and would result in a messy finish.

The compositions of the present invention have the capability of being sprayed in very heavy films and drying without bubbling, pinholing, and may be readily sanded.

The compositions of the present invention contain more solids than other lacquer primers. The high solids, freedom from cracking, high and fast build, filling of nicks and scratches, and fast and easy sanding are unique qualities and characteristics. While the compositions are primarily intended for repair of shallow depressions such as nicks and scratches, they may be used to fill holes and depressions a quarter inch deep.

One of the problems encountered and solved in formulation of the compositions of this invention was pigment settling. In an aerosol can the pigments remain soft and easily redispersible over a long period of time. The formulation of the present invention makes it possible to provide high pigment and solids concentrations in combination with high build qualities all in an aerosol product.

The present composition is made up of film-forming agents, anti-settling agents, pigments, resins, solvents and vehicles which may be manufactured by standard paint manufacturing equipment and techniques.

The film-forming agents, or vehicle, that may be used in the compositions of this invention include $\frac{1}{2}$ second viscosity regular soluble nitrocellulose of 20 percent solids in methyl ethyl ketone ($\frac{1}{2}$ sec R snc 20%), coconut oil alkyd, butyl benzyl phthalate, and the like. The pigments and solids may be any of these known for use in paints and include titanium dioxide, lampblack paste, calcium carbonate, magnesium silicate, and the like.

The anti-settling agent is preferably an organic calcium bentonite although others may be used. The anti-settling agent is present in a volume ratio of about 1:10 to 1:50 of the solids.

Other ingredients known in the paint arts may also be used, such as solvents, retarder solvents, wetting agents, grinding agents, fillers, anti-blinding agents, bonding agents and the like.

EXAMPLE 1

This example shows the preparation of a preferred embodiment of the present invention.

CONCENTRATE

The following ingredients in the stated amounts are ground in a sand mill to a Hegman grind equal to 6. (ASTM D1210-64 Reapproved 1970)

| Ingredients | Pounds | Gallons | KGM | Liters | Percent By Weight |
|---|---|---|---|---|---|
| A | 251.1 | 33.93* | 113.89 | 128.44 | 25.96 |
| B | 165.4 | 19.01* | 75.00 | 71.95 | 17.10 |
| C | 20.3 | 2.17* | 9.21 | 8.22 | 2.10 |
| D | 37.6 | 4.70* | 17.06 | 17.80 | 3.89 |
| E | 122.5 | 18.29* | 55.58 | 69.23 | 12.67 |
| F | 15.6 | 1.88* | 7.08 | 7.12 | 1.61 |
| G | 7.5 | 1.01* | 3.40 | 3.84 | 0.78 |
| H | 15.0 | 1.91* | 6.81 | 7.24 | 1.55 |
| I | 7.5 | .82* | 3.40 | 3.12 | 0.78 |
| J | 94.0 | 2.69* | 42.65 | 10.19 | 9.72 |
| K | 94.0 | 4.17* | 42.65 | 15.77 | 9.72 |
| L | 94.0 | 4.04* | 42.65 | 15.30 | 9.72 |
| M | 23.8 | 3.26* | 10.80 | 12.35 | 2.46 |
| N | 18.8 | 2.11* | 8.53 | 8.00 | 1.94 |

| Ingredients | Pounds | Gallons | KGM | Liters | Percent By Weight |
|---|---|---|---|---|---|
| | 967.2 | 100.00* | 438.71 | 378.54 | 100.00 |

Ingredient A is ½ of 20 percent solids in methyl ethyl ketone and acts as a film-former. The ingredient is identified by CAS Number 9004-70-0 in accordance with the Toxic Substances Control Act.

Ingredient B is coconut oil modified alkyd resin and acts as a film-former and plasticizer and prevents cracking. CAS Number 66070-87-9.

Ingredient C is butyl benzyl phthalate and acts as a plasticizer and prevents cracking. CAS Number 85-68-7.

Ingredients A, B and C collectively are the vehicle.

Ingredient D is cellosolve acetate and is chemically ethylene glycol monoethyl ether acetate. The ingredient acts as a retarder solvent which prevents blushing of the film and propellent entrapment. CAS Number 111-15-9.

Ingredient E is methyl ethyl ketone and acts as a solvent. CAS Number 78-93-3.

Ingredient F is a wetting agent for the pigment during grinding, and is commercially available under the trade name Ni-Par S-30. The ingredient is 7.8 percent 2-nitropopane (CAS Number 79-46-9) and 1-nitropropane. CAS Number 108-03-2.

Ingredient G is commercially available under the trade name MPA-1078X Anti-Set. The ingredient is an organic calcium bentonite. It acts as an anti-settling agent to prevent the pigment from settling hard during storage prior to use. CAS Number 1302-78-9.

Ingredient H is a wetting and grinding agent. A soya lecithin may be used. CAS Number 8002-43-5. An equivalent is commercially available under the trade name Nuo-Sperse #657 which is proprietary compound believed to be a linseed oil alkyd.

Ingredient I is zinc stearate which is a pigment and aids smoother finishing and decreases clogging or blinding of sandpaper during finishing. CAS Number 557-05-1.

Ingredient J is titanium dioxide and is the principal opacifying pigment. It also acts as a builder and adds solids. CAS Number 1317-80-2.

Ingredient K is calcium carbonate which is a pigment and, acts as a filler to add bulk and also as a flatting agent. CAS Number 471-34-1.

Ingredient L is magnesium silicate which is a pigment, and acts as a filler to add bulk and also as a flatting agent. CAS Number 1343-88-0.

Ingredient M is a solution of malic acid in methyl alcohol, and aids adhesion to bare steel. CAS Number 6915-15-7.

Ingredient N is lampblack dispersed in nitrocellulose to form a paste and acts as a pigment. CAS Number 1333-86-4.

The concentrate has a solids content of 48.25 percent by weight which is repeated formulations may vary by three percent.

AEROSOL

For aerosol dispensing the concentrate prepared above was mixed with solvents and propellants according to the following formula and filled into an aerosol container:

| | |
|---|---|
| Concentrate | 160 grams |
| Solvent | 140 grams |
| Propellent | 74 grams |
| Total | 374 grams |

The solvent is 115 grams acetone and 25 grams cellosolve acetate. The propellent is 50 percent propane and 50 percent isobutane.

The solids content in the aerosol container is 20.65 percent by weight of the combined weight of concentrate, solvent and propellent. In repeated formulations, this may vary by 1.5 percent. The aerosol composition was tested and had the following characteristics. The above composition weighed 9.67 lbs. per gallon and had a specific gravity of 1.1590. The composition had a #4 Ford cup viscosity of 45 seconds at 25° degrees C. (ANSI/ASTM D1200-70 Reapproved 1976). The composition had a 60° degree gloss equal to 5 at 2 mil. The hide/coverage was equal to 900 sq. ft. per gallon as determined by use of the Pfund cryptometer. The drying time was 10 minutes to set and 30 minutes through thorough dry. (ANSI/ASTM D1640-69 Reapproved 1974).

What is claimed is:

1. A combination scratch filler and primer concentrated composition for dispensing in an aerosol dispensing system consisting essentially of:

| | Percent By Weight |
|---|---|
| ½ Sec. RSNC 20% | 25.96 |
| Coconut Oil Alkyd | 17.10 |
| Butyl Benzyl Phthalate | 2.10 |
| Cellosolve Acetate | 3.89 |
| Methyl Ethyl Ketone | 12.67 |
| Nitropropane | 1.61 |
| Organic Calcium Bentonite | 0.78 |
| Soya Lecithin | 1.55 |
| Zinc Stearate | 0.78 |
| Titanium Dioxide | 9.72 |
| Calcium Carbonate | 9.72 |
| Magnesium Silicate | 9.72 |
| Malic Acid | 2.46 |
| Lampblack Paste-NC | 1.94 |
| | 100.00 |

2. A combination filler and primer for dispensing in an aerosol dispensing system comprising:
   a. from 40 to 45 percent by weight of a concentrate having the following ingredients:

| | Percent By Weight |
|---|---|
| ½ Sec. RSNC 20% | 25.96 |
| Coconut Oil Alkyd | 17.10 |
| Butyl Benzyl Phthalate | 2.10 |
| Cellosolve Acetate | 3.89 |
| Methyl Ethyl Ketone | 12.67 |
| Nitropropane | 1.61 |
| Organic Calcium Bentonite | 0.78 |
| Soya Lecithin | 1.55 |
| Zinc Stearate | 0.78 |
| Titanium Dioxide | 9.72 |
| Calcium Carbonate | 9.72 |
| Magnesium Silicate | 9.72 |
| Malic Acid | 2.46 |
| Lampblack Paste-NC | 1.94 |
| | 100.00 | b. from 35 to 40 percent by weight of a solvent; and
c. from 15 to 25 percent by weight of an aerosol propellent.

3. A method of simultaneously filling and priming small dents and scratches in a patented substrate comprising:
   a. adding the composition of claim 1, a solvent system and an aerosol propellent effective to produce a #4 Ford cup viscosity of about 45 seconds at 25 degrees Celsius, into a spray valve equipped container;
   b. agitating the contents of the container to a uniform dispersion;
   c. spraying a plurality of thin layers of the composition on the surface to be treated; and
   d. sanding the layers to a glossy finish.

* * * * *

UNITED STATES PATENT AND TRADEMARK OFFICE
CERTIFICATE OF CORRECTION

PATENT NO. : 4,372,991

DATED : February 8, 1983

INVENTOR(S) : Stanley E. Kendall

It is certified that error appears in the above-identified patent and that said Letters Patent are hereby corrected as shown below:

Column 3, line 8: between "1/2" and "of" insert — second viscosity regular soluble nitrocellulose (RSNC) —, Column 3, line 29: "2-nitropopane" should read — 2-nitropropane —, Column 3, line 61: "is" should read — in —.

Signed and Sealed this

Third Day of May 1983

[SEAL]

Attest:

Attesting Officer

GERALD J. MOSSINGHOFF

Commissioner of Patents and Trademarks